United States Patent [19]

Kaneko

[11] Patent Number: 4,681,438
[45] Date of Patent: Jul. 21, 1987

[54] AUTOMATIC COMPENSATOR FOR COMPENSATING COLLIMATION ERROR DUE TO TWO-DIRECTIONAL INCLINATION IN SURVEYING INSTRUMENTS

[75] Inventor: Kenji Kaneko, Higashiyamato, Japan
[73] Assignee: Asahi Precision Co. Ltd., Tokyo, Japan
[21] Appl. No.: 807,470
[22] Filed: Dec. 10, 1985
[30] Foreign Application Priority Data Dec. 18, 1984 [JP] Japan .................. 59-191865[U]

[51] Int. Cl.⁴ .............................................. G01C 1/06
[52] U.S. Cl. .................................... 356/143; 356/148
[58] Field of Search ............... 356/143, 148, 250, 138, 356/153, 149; 33/283

[56] References Cited

U.S. PATENT DOCUMENTS 3,220,297  11/1965  Baker et al. .................. 356/250
4,142,800  3/1979  Paget ........................... 356/250

FOREIGN PATENT DOCUMENTS 1208508  5/1966  Fed. Rep. of Germany ...... 356/250
2034073  5/1980  United Kingdom ............... 356/138

Primary Examiner—R. A. Rosenberger
Assistant Examiner—Crystal D. Cooper
Attorney, Agent, or Firm—Fred Philpitt

[57] ABSTRACT

An optical plummet mechanism for compensating an error due to an inclination of a surveying instrument comprises a first pendulum suspended in the instrument body interior, a second pendulum suspended in a perpendicular relation to the first pendulum, a first reflector provided on the first pendulum for reflecting light incident in the direction of a collimation axis of a collimation lens in the direction of a substantially horizontal collimation axis lying in the plane of swinging of the first pendulum, and a second reflector provided on the second pendulum and being a double reflecting surface reflector for reflecting light incident in the direction of a collimation axis lying the the plane of swinging of the first pendulum in the direction of a vertical collimation axis. Collimation errors due to inclination of the instrument body in two directions, i.e., back-and-forth direction and left-to-right direction, can be simultaneously automatically compensated for by the pendulum actions of the first and second pendulums in perpendicular directions.

4 Claims, 12 Drawing Figures

F I G. 11
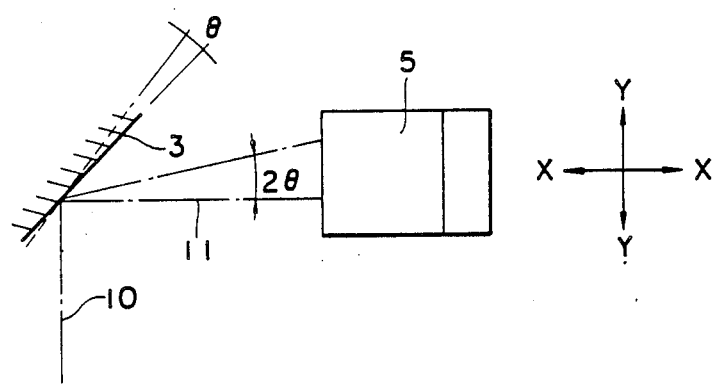
F I G. 12
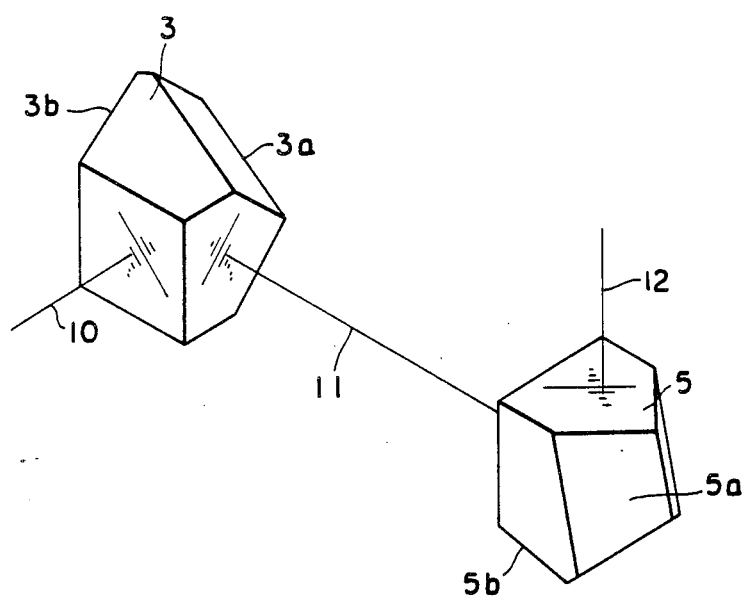

AUTOMATIC COMPENSATOR FOR COMPENSATING COLLIMATION ERROR DUE TO TWO-DIRECTIONAL INCLINATION IN SURVEYING INSTRUMENTS

BACKGROUND OF THE INVENTION

1. Field of the Invention

This invention relates to an automatic compensator for compensating a collimation error due to a twodirectional inclination in surveying instruments such as automatic rotational beam levels and automatic optical plummets and, more particularly, to a device for automatically compensating a collimation error due to inclination of the instument body in two directions, i.e., back-and-forth direction and left-to-right direction by a pendulum mounted with a reflector.

2. Description of the Prior Art

A well-known surveying instrument such as an automatic optical plummet is provided with a device, which includes a reflector mounted at the lower end of a pendulum suspended in the instrument body interior. When the instrument body is inclined in the back-and-forth direction, the collimation axis of the instrument is automatically corrected to a vertical direction by the swing action of the pendulum. In this case, compensation is done for an error due to inclination of the instrument body only in one direction. However, when the instrument body is inclined not only in the back-and-forth direction but also in the left-to-right direction, the errors in these two directions can not be compensated at a time.

Therefore, in the prior art automatic optical plummet, a vertical plane in the back-and-forth direction is first set with respect to a certain direction, then the instrument body is rotated 90°, and then a vertical plane in the back-and-forth direction is set again. The intersection between the two vertical planes is obtained to set the true zenith direction. This method is very cumbersome in operation, and it is impossible to directly set the true zenith direction.

SUMMARY OF THE INVENTION

An object of the present invention is to provide an automatic compensator for compensating a collimation error due to a two-directional inclination in surveying instruments for simultaneously automatically compensating a collimation errors due to inclination of the instrument body in two directions, i.e., back-and-forth direction and left-to-right direction.

Another object of the present invention is to provide an automatic compensator for compensating a collimation error due to a two-directional inclination in surveying instruments, which can automatically cancel even errors due to rattling of bearings supporting shafts of pendulums carrying reflectors pivotably for error compensation or twisting of thin wire-like or ribbon-like supports of pendulums.

A further object of the present invention is to provide an automatic compensator for compensating a collimation error due to a two-directional inclination in surveying instruments, in which a light beam accurately directed in the zenith direction can be caused to be incident on a pentagon prism or the like revolving about a vertical axis in an automatic rotational beam level to thereby obtain an accurately horizontal revolving light beam.

A still further object of the present invention is to provide an automatic compensator for compensating a collimation error due to a two directional inclination in surveying instruments, which permits accurate vertical collimation by reliably compensating errors in an automatic optical plummet.

Particularly, according to the present invention there is provided an automatic compensator for compensating a collimation error due to a two-directional inclination in surveying instruments, which comprises a first pendulum suspended in the instrument body interior, a second pendulum also suspended in the instrument body interior and ahead and sidewise of the first pendulum for swinging in directions perpendicular to the first pendulum, a first reflector mounted on the first pendulum at the lower end thereof and causing a collimation axis of a collimation lens parallel to the direction of swinging of the first pendulum to be reflected in a substantially horizontal direction of swinging of the first pendulum, and a second reflector mounted on the second pendulum at the lower end thereof and being a double reflecting surface reflector for causing a collimation axis lying in the plane of swinging of the first pendulum to be reflected in the vertical direction, whereby errors due to inclination of the instrument body in the back-and-forth direction and left-to-right direction can be automatically compensated for by the swing action of the first and second pendulums in perpendicular directions.

BRIEF DESCRIPTION OF THE DRAWINGS

These and other objects and advantages of the invention will become more fully apparent as the following description when read in conjunction with the drawings, wherein:

FIG. 11 is a plan view illustrating a state of reflection obtained when a single reflecting surface reflector is used as a first reflector used in the compensator according to the present invention; and FIG. 12 is a perspective view showing a further embodiment of the first and second reflectors used in the compensator according to the present invention.

DESCRIPTION OF THE PREFERRED EMBODIMENTS

Figure 1:
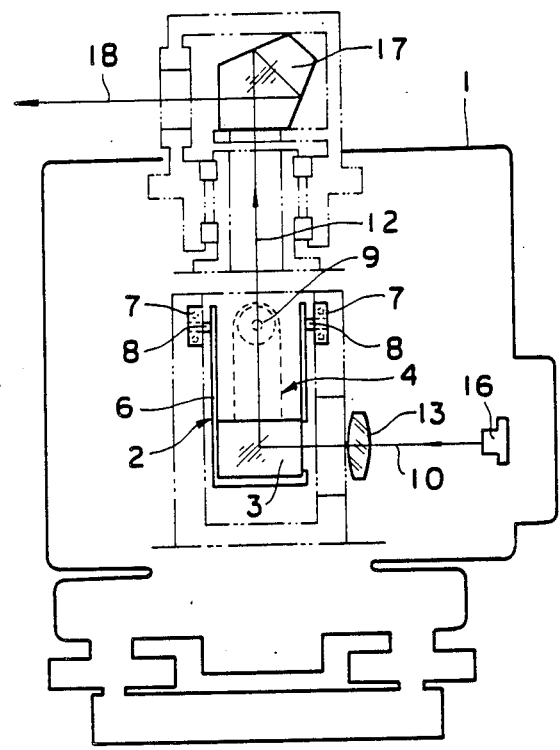
FIG. 1 is a longitudinal sectional view showing a compensator according to the present invention assembled in a surveying instrument body.

An instrument body 1 of a surveying instrument such as an automatic rotational beam level accommodates first and second pendulums 2 and 4 with respective first and second reflectors 3 and 5 provided at the lower end. the first and second pendulums 2 and 4 are suspended such that they can swing about perpendicular directions, as shown in FIG. 1, that is, they can swing back and forth and to the left and right, respectively, with respect to the instrument body 1.

Figure 2:
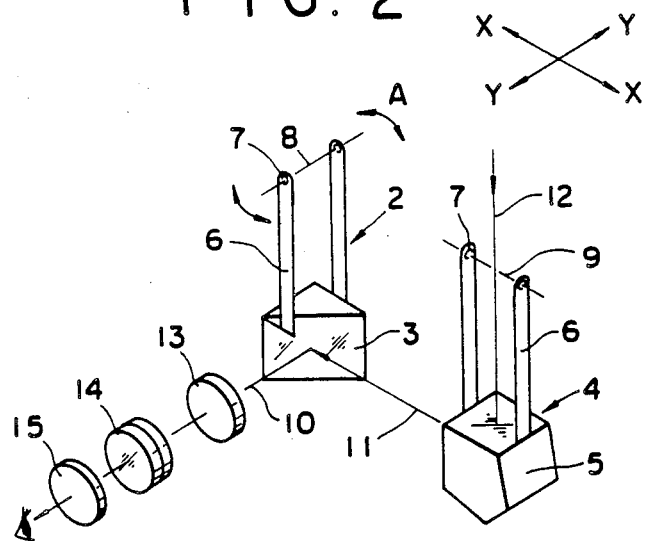
FIG. 2 is a perspective view outlying the present invention applied to an automatic optical plummet using pendulums with rigid bar-like supports.
Figure 3:
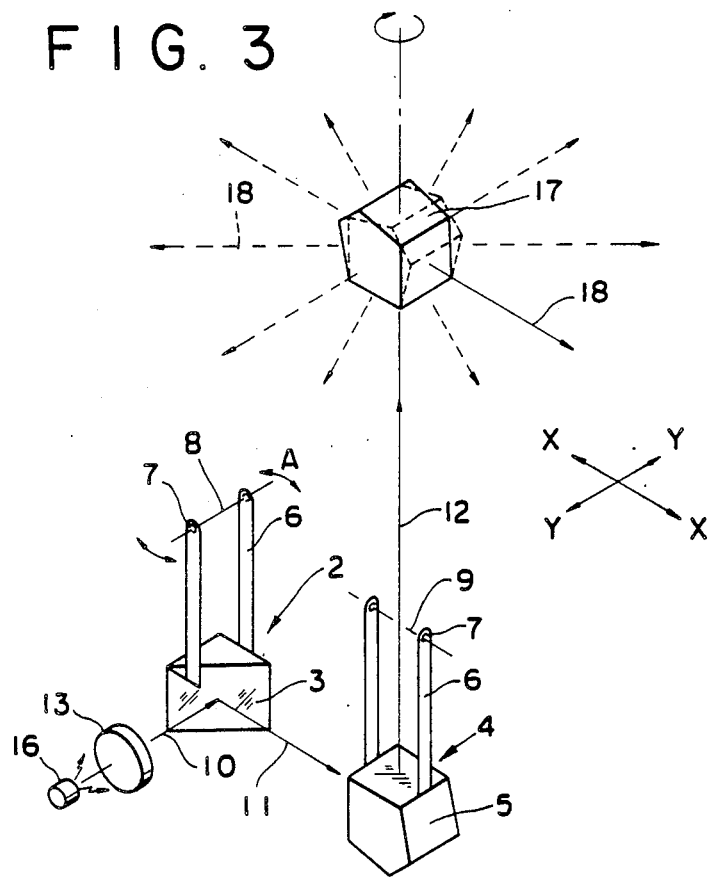
FIG. 3 is a perspective view outlying the present invention applied to an automatic rotational beam level using pendulums with rigid bar-like supports.

As shown in FIGS. 2 and 3, the first and second pendulums 2 and 4 have rigid bar-like supports 6 supported by bearings 7 on perpendicular shafts 8 and 9 extending in a horizontal plane. The second pendulum 4 is disposed ahead of the first pendulum 2 in the direction of swinging thereof. The first and second reflectors 3 and 5 mounted on the first and second pendulums face each other in horizontal directions.

The first reflector 3 has a reflecting surface which reflects light in the direction of a collimation axis 10 parallel to the shaft 8 of the first pendulum 2 and led through a collimation lens 13 and in the direction of a collimation axis 11 parallel to the shaft 9 of the second pendulum 4 and led through said pendulum 4.

Accordingly, the incident light beam in the direction of the collimation axis 10 is reflected along the collimation axis 11. On the contrary, the incident light beam in the direction of the collimation axis 11 is reflected along the collimation axis 10.

The second reflector 5 has a reflecting surface which reflects light in the direction of a collimation axis 12 perpendicular to and led through the collimation axis 11 and second pendulum 4.

Accordingly, the incident light beam in the direction of the collimation axis 11 is reflected along the collimation axis 12. On the contrary, the incident light beam in the direction of the collimation axis 12 is reflected along the collimation axis 11.

Figure 4:
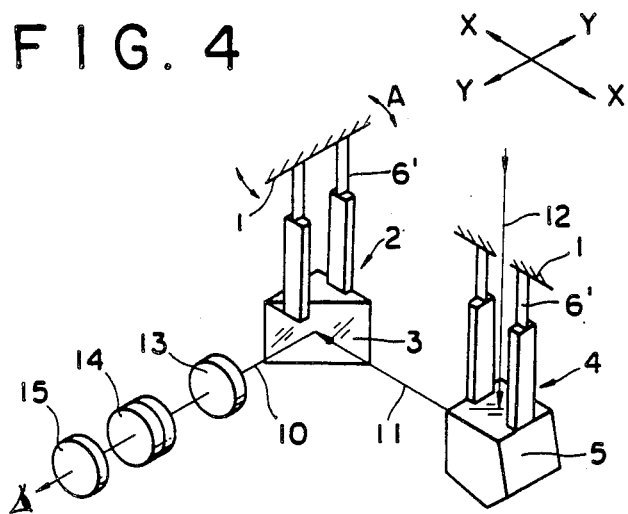
FIG. 4 is a perspective view outlying the present invention applied to an automatic optical plummet using pendulums with this ribbon-like supports.
Figure 5:
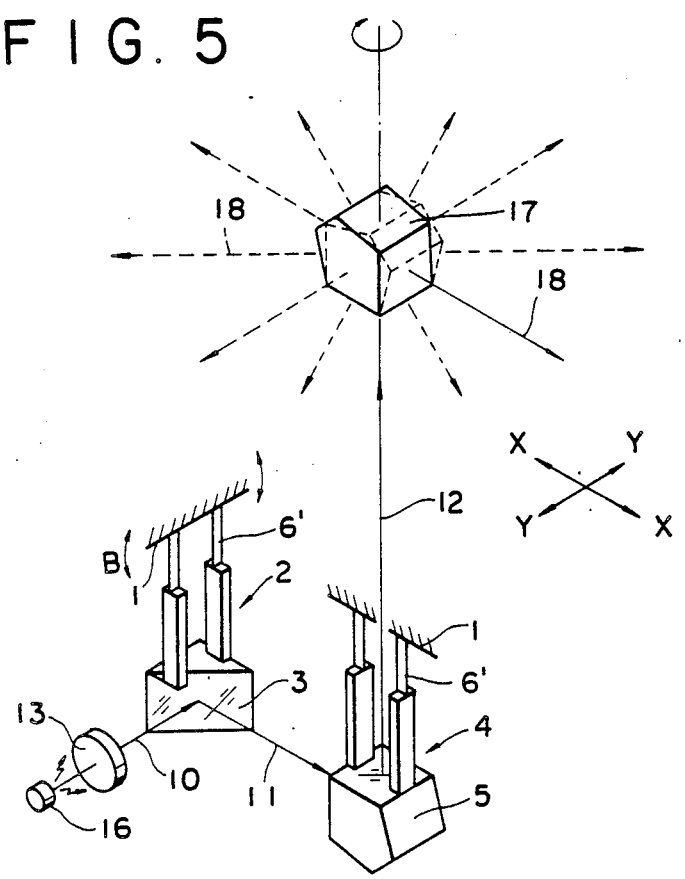
FIG. 5 is a perspective view outlying the present invention applied to an automatic rotational beam level using pendulums with thin ribbon-like supports.

FIGS. 4 and 5 show a modification of rigid bar-like supports 6 shown in FIGS. 2 and 3. In this instance, soft thin ribbon-like supports 6' are employed in lieu of the rigid bar-like supports 6 shown in FIGS. 2 and 3. The ribbon-like supports 6' are secured at the top to the instrument body 1 such that they can swing in a perpendicular direction thereto due to their flexibility. The rest of the structure is the same as in the case of FIGS. 2 and 3.

Figure 6:
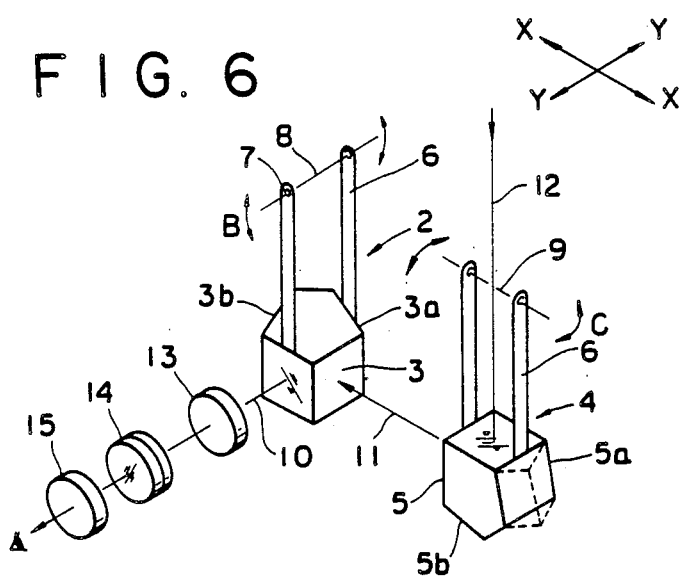
FIG. 6 is perspective view outlying a further embodiment of the present invention applied to an automatic optical plummet using the pendulums with rigid bar-like supports.

FIGS. 2, 4 and 6 show a case where an optical plummet mechanism constituted by the first and second pendulums 2 and 4 is employed to constitute an automatic optical plummet for obtaining vertical point visually. The collimation lens 13, a reticle 14 and an eyepiece lens 15 are provided on the collimation axis 10. Incident light beam led from the vertical point along the collimation axis 12 is reflected by the second reflector 5 to be incident on the first reflector 3 along the collimation axis 11. The first reflector 3 then reflects the incident light beam along the collimation axis 10 to be focused on the reticle 14 through the collimation lens 13. Thereby the vertical point can be visually collimated by the eyepiece lens 15.

Figure 7:
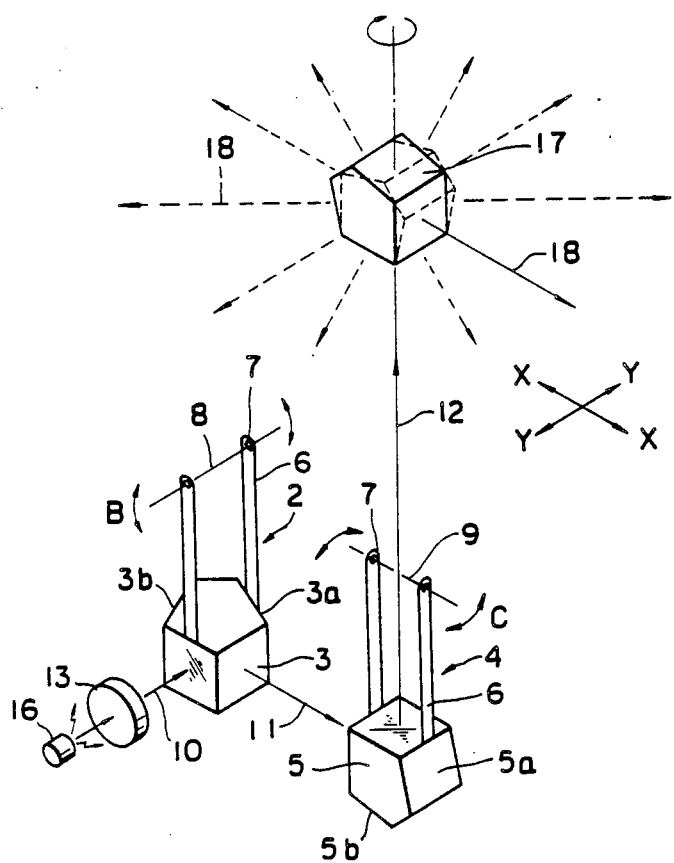
FIG. 7 is a perspective view showing a further embodiment of the present invention applied to an automatic rotational beam level using the pendulums with rigid bar-like supports.

FIGS. 3, 5 and 7 show a case where the optical plummet mechanism constituted by the first and second pendulums 2 and 4 is employed to constitute an automatic rotational beam level. The collimation lens 13 and a light source 16 are provided on the collimation axis 10. A third reflector 17, e.g., a pentagon prism, is provided on the collimation axis 12. The third reflector 17 is rotated about the collimation axis 12 while perpendicularly reflecting the incident light beam, which is led from the light source 16 along the collimation axis 12, in the horizontal directions. Horizontal light beams 18 that are reflected by the third reflector 17 are received at a plurality of measuring points around the third reflector 17, whereby the level of these light-receiving points is measured.

The structure that is obtained by removing the third reflector 17 from the automatic rotational beam level shown in FIGS. 1, 3, 5 and 7, may constitute an automatic optical plummet, in which the light beams that are reflected by the light source 16 in the vertical direction are received to obtain the position of these light-reciving points for thereby indicating a vertical point.

Figure 8:
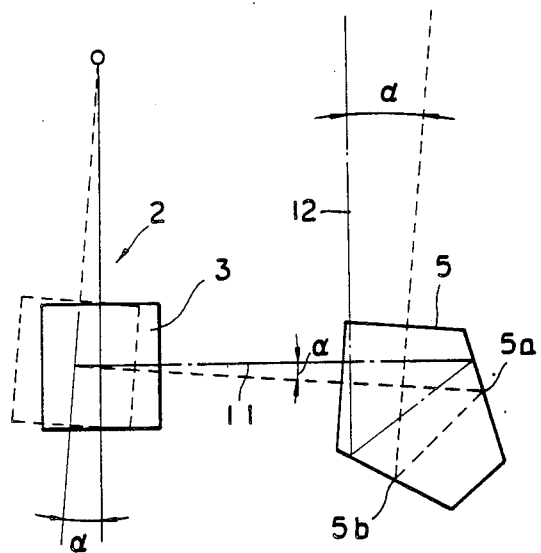
FIG. 8 is a side view showing the principles underlying the compensation by the compensator according to the present invention.
Figure 9:
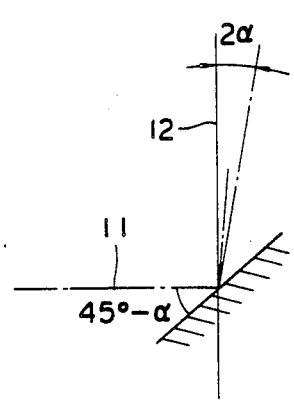
FIG. 9 is a side view illustrating the principles of incapability of compensation for error when a single reflecting surface reflector is used as a second reflector of the compensator according to the present invention.

FIG. 8 illustrates the principles underlying the compensation by the optical plummet mechanism described above in case when an inclination angle $\alpha$ occurs in the surveying instrument with respect to X—X direction shown in the arrow of FIGS. 2 to 7. When the instrument body 1 is inclined by the angle $\alpha$ the second pendulum 4 is inclined together with the second reflector 5 by the angle $\alpha$, although the first pendulum 2 is held vertical to maintain the collimation axis 11 horizontal owing to the pendulum action.

Where the second reflector 5 is a single reflecting source reflector as shown in FIG. 9, light incident in the direction of the collimation axis 11 is reflected in a direction at an inclination angle of $2\alpha$ with respect to the vertical collimation axis 12. Also, light incident in the direction of the vertical collimation axis 12 is reflected in a direction at an inclination angle of $2\alpha$ with respect to the collimation axis 11. In either case, a collimation error of $2\alpha$ is produced in the direction of the incident or reflected light beam.

Accordingly, a double reflecting surface reflector, e.g., a pentagon prism, which has two reflecting surfaces 5a and 5b which can reflect incident light in the perpendicular direction at all time irrespective of the incidence angle, is used as the second reflector 5. In this case, even if the instrument body 1 is inclined by the angle $\alpha$ with respect to X—X direction, the light beam indicent in the vertical direction along the collimation axis 12 is reflected in the truly horizontal direction of the collimation axis 11. Also, the light beam incident in the direction of the collimation axis 11 with the inclination angle $\alpha$ is reflected in the truly vertical direction of the collimation axis 12. The collimation error thus can be reliably compensated.

Figure 10:
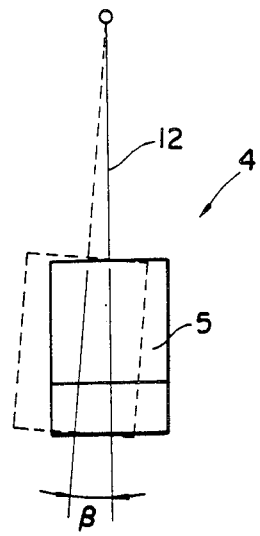
FIG. 10 is a front view illustrating an error compensation action of the pendulum of the second reflector used in the compensator according to the present invention.

When the instrument body 1 is inclined by an angle $\beta$ in Y—Y direction, the second reflector 5 is held vertical by the pendulum action of the second pendulum 4 as shown in FIG. 10. Thus, it is possible to maintain the collimation axis 12 vertical and the collimation axis 11 perpendicular thereto irrespective of the inclination angle $\beta$, thus effecting compensation for the collimation error.

It is possible that a rotational displacement $\theta$ of the first pendulum 2 in horizontal rotational directions A as shown in FIGS. 3 and 4 is caused by rattling of bearings in case of the rigid bar-like supports 6 or twisting of the thin ribbon-like supports 6'. In such a case, a deviation angle $2\theta$ of the collimation axis 11 causes a collimation error of the collimation axis 12 in Y—Y directions as shown in FIG. 11. Where the displacement as noted above is possible, the collimation error can be eliminated by using as the first reflector 3 a double reflecting surface reflector such as a pentagon prism, as shown in FIGS. 6 and 7, having two reflecting surfaces 3a and 3b.

It is also possible that a deviation angle of the first pendulum 2 in vertical rotational directions B is caused by elongation or contraction of thin ribbon-like supports 6' or rattling of mounting portions of the rigid bar-like supports 6. In such a case, a similar deviation angle $\alpha$ of the collimation axis 11 as shown in FIG. 9 will cause a collimation error of the collimation axis 12 in X—X directions. Where the deviation angle as noted above is possible, the collimation error may be reduced to one half by using a roof prism or the like, in which either one of reflecting surfaces 3a and 3b corresponding to the collimation axis 10 or 11 of a double reflecting surface reflector as the first reflector 3 is used a roof surface. More preferably, the collimation error can be reduced to zero by using a roof prism, in which both reflecting surfaces 3a and 3b are used as roof surfaces.

Further, it is possible that a deviation angle of the second pendulum 4 in horizontal rotational directions C is caused by the same reason as noted above as shown in FIGS. 6 and 7. In such a case, a collimation error of the collimation axis 12 in Y—Y directions is caused. Where such deviation angle is possible, the collimation error may be reduced to one half or zero by using as the second reflector 5 a roof prism, in which either one or both of the reflecting surfaces 5a and 5b corresponding to the collimation axes 12 and 11 of the double reflecting surface reflector is used a roof surface.

Therefore, with an optical plummet mechanism which is provided with all the functions described above, it is possible to perfectly compensate for any collimation error due to inclination of the instrument body 1 with respect to perpendicular X—X and Y—Y directions or deviation of the mounting portions of the first and second pendulums.

The present invention may be embodied in other specific forms without departing from the spirit or essential characteristics thereof. The presently disclosed embodiments are therefore to be considered in all respects as illustrative and not restrictive, the scope of the invention being indicated by appended claims, rather than the foregoing description, and all changes which come within the meaning and range of equivalency of the claims are, therefore, to be embraced therein.

What is claimed is:

1. An automatic compensator for compensating a collimation error due to a two-directional inclination in surveying instruments comprising:

a first pendulum suspended in the instrument body interior;

a second pendulum also suspended in the instrument body interior and ahead and sidewise of said first pendulum for swinging in directions perpendicular to said first pendulum;

a first reflector mounted on said first pendulum at the lower end thereof and having a reflecting surface for reflecting light incident in the direction of a collimation axis parallel to the axis of swinging of said first pendulum in a direction of a substantially horizontal collimation axis lying in the plane of swinging of said first pendulum; and a second reflector mounted on said second pendulum at the lower end thereof and being a double reflecting surface reflector for reflecting light incident in the direction of a collimation axis lying in the plane of swinging of said first pendulum in the direction of a vertical collimation axis.

2. The automatic compensator for compensating a collimation error due to a two-directional inclination in surveying instruments according to claim 1, wherein said first reflector is a double reflecting surface reflector.

3. The automatic compensator for compensating a collimation error due to a two-directional inclination in surveying instruments according to claim 2, wherein at least one of two reflecting surfaces of said first reflector serves as a roof surface.

4. The automatic compensator for compensating a collimation error due to a two-directional inclination in surveying instruments according to claim 3, wherein at least one of two reflecting surfaces of said second reflector serves as a roof surface.

* * * * *